United States Patent [19]

Dobson et al.

[11] 3,956,613

[45] May 11, 1976

[54] BASE ELEMENT FOR AN IMMERSIBLE ELECTRIC COFFEE MAKER

[75] Inventors: William C. Dobson; James M. Straughn, both of West Bend, Wis.

[73] Assignee: Dart Industries Inc., Los Angeles, Calif.

[22] Filed: Mar. 5, 1975

[21] Appl. No.: 555,471

[52] U.S. Cl. .............................. 219/436; 174/76; 219/432; 219/541
[51] Int. Cl.² ...................................... F27D 11/02
[58] Field of Search ........... 219/432, 433, 435, 436, 219/437, 439, 441, 442, 541; 174/76; 200/302

[56] References Cited
UNITED STATES PATENTS

| | | | |
|---|---|---|---|
| 2,915,614 | 12/1959 | Loomis | 219/441 |
| 3,135,189 | 6/1964 | Jason et al. | 219/44 X |
| 3,144,547 | 8/1964 | Price | 219/441 |
| 3,184,579 | 5/1965 | Wickenberg | 219/441 |
| 3,333,087 | 7/1967 | Manship et al. | 219/442 |
| 3,585,275 | 6/1972 | Gillemot et al. | 174/76 |
| 3,597,528 | 8/1971 | Penfield | 174/76 X |
| 3,736,405 | 5/1973 | Bryson et al. | 219/541 X |

*Primary Examiner*—Volodymyr Y. Mayewsky
*Attorney, Agent, or Firm*—Paul R. Wylie; Leigh B. Taylor; Kenneth J. Hovet

[57] ABSTRACT

A generally bowl-shaped coffee maker base structure is disclosed having a plurality of receptacles extending upwardly from the structure bottom. Exposed electrical terminals common with electrical parts on an electric coffee maker are positioned within the appropriate receptacles. The electrical terminals are encapsulated by filling the receptacles with a liquid hardenable sealing compound. The compound is cured and hardens to provide watertight corrosion-proof terminals to produce an immersible unitary base structure for a coffee maker.

4 Claims, 3 Drawing Figures

BASE ELEMENT FOR AN IMMERSIBLE ELECTRIC COFFEE MAKER

BACKGROUND OF THE INVENTION

1. Field of the Invention

The present invention relates to immersible electrical cooking utensils and, more particularly, to a base structure adapted to allow the encapsulation and sealing of electrical terminals.

2. Description of the Prior Art

The ability to immerse and wash an electrical cooking utensil is highly desirable but oftentimes not possible without resulting in corrosion or other damage to the electrical components resulting in a safety hazard. This is particularly true in electrical coffee makers such as percolators wherein the heating unit, thermostat, electrical connectors, terminals and the like are contained within a plastic base assembly.

Past efforts to make coffee makers waterproof are shown in U.S. Pat. Nos. 3,135,189, 3,184,579 and 3,144,547 wherein either the entire base unit or the heating unit and thermostat control are connected to the bottom of the coffee maker by means of resilient gaskets and sheathed electrical heating and control units. Although these means accomplished their purpose, they resulted in extraordinarily expensive parts, required extra maintenance, and necessitated substantial assembly time to produce.

A simplified approach was that disclosed in U.S. Pat. No. 2,915,614 to Loomis. The Loomis procedure was to form a shell about the base portion of an electrical percolator surrounding the electrical heating unit and terminals and then fill the shell with a flowable insulating material. Modifications of this were to simply dip or spray the heating unit and electrical connections with an insulating material prior to their becoming fully "set". It is clear, however, that the Loomis technique required considerable amounts of flowable insulating material and resulted in substantially heavy coffee makers. Also, because the heating units are located in the base, thermal expansion caused crazing and cracking of the insulating material.

SUMMARY OF THE INVENTION

The present invention provides a base structure which houses the electrical components commonly used with electrical cooking utensils. The structure provides a simple efficient means for encapsulating exposed electrical parts with a liquid sealing material so that the utensil can be immersed in a cleaning liquid without danger of corrosion or other damage which may constitute a safety hazard.

The base structure has the general shape of a bowl having a bottom with peripheral sidewalls and includes a series of upstanding pedestals extending from the bottom interior surface. The pedestals have pockets or are hollow in at least their top portion and are of a size to allow the placement of exposed terminal ends of electrical parts. The terminal ends are inserted in the pockets and subsequently filled with a liquid hardenable sealing composition such as silicone rubber compositions, "Silastic", rubber, polyester or epoxy resins.

Preferably, there is one pedestal for each electrical connection or end terminal having exposed wires or conductors. Alternatively, more than one electrical connection or terminal may share one pedestal. In this manner each terminal can be completely immersed and encased in the sealing material. The pedestals are conveniently an integral part of the bowl structure and can be formed in one casting or molding operation inasmuch as the base structure is of a heat insulating and electrically non-conductive plastic material.

With the present invention the use of complicated sealing members and complicated fitments is avoided in that each of the exposed electrical terminals are completely encased in the liquid hardenable sealing material. Each of the pedestals is equipped with a mounting means such as an opening that allows for the insertion and retention of the electrical part within the pocket. The mounting means locates the terminals away from the sidewalls of the pedestals so that the liquid hardenable insulating and sealing material may completely encase all portions of the exposed terminal. The mounting openings vary in size in accordance with the configuration of the electrical parts which are to be immersed.

The sidewalls of the bowl-shaped base structure include an outlet opening. Adjacent to the opening is positioned an electrical outlet connector. The outlet opening is partially enclosed with a partition having means for locating and positioning the electrical connector and includes an adjacent pedestal with corresponding pockets for embedding and sealing the terminal ends of the electrical connectors.

DESCRIPTION OF THE PREFERRED EMBODIMENT

Figure 1:
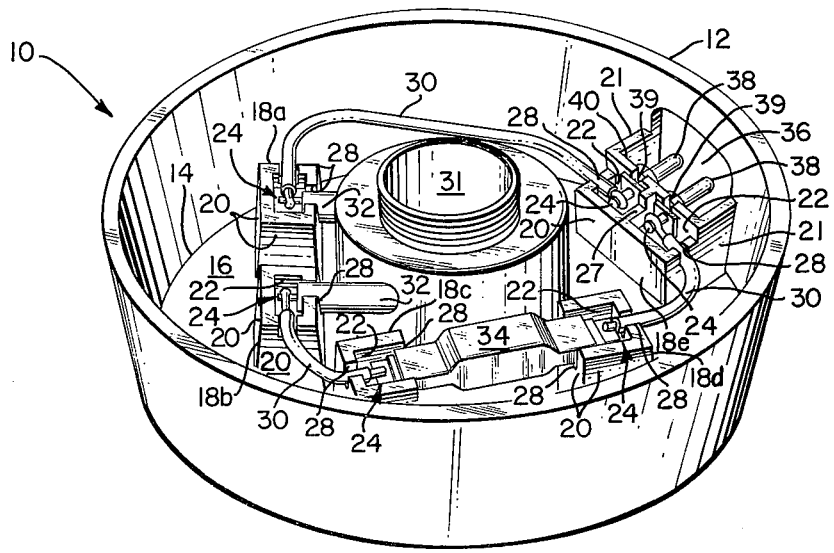
FIG. 1 is a perspective view of the cooking utensil base structure of the present invention.
Figure 2:
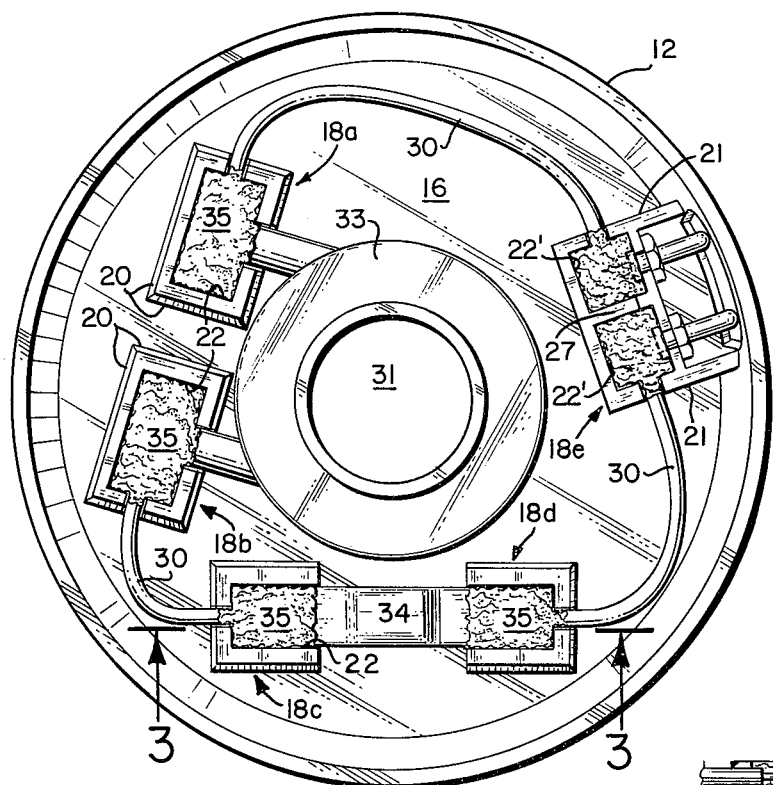
FIG. 2 is a plan view of the base structure of FIG. 1 with the pockets filled with sealing material.

Referring now to the drawings and, more particularly to FIG. 1 thereof, the cooking utensil base structure of the present invention is shown generally by reference numeral 10. The base structure includes integral upstanding sidewalls 12 integral with a bottom portion 14. The bottom portion includes a bottom interior surface 16 from which extend upstanding pedestals 18. Each of the pedestals has sidewalls 20 forming a four-sided unitary structure. At least a portion of the pedestal interior is hollow to form receptacles or pockets 22 for the retention of a liquid sealing material. Each of the receptacles is positioned about the bottom 16 at locations proximate exposed electrical part terminals. For example, FIGS. 1 and 2 show heater 31 having two terminals 32 extending transversely from the heater into receptacles 22 of pedestals 18a and 18b. Similarly, pedestals 18c and 18d are located at opposite ends of thermostat 34 and pedestal 18e is located at the terminal end of electrical connectors 38.

Figure 3:
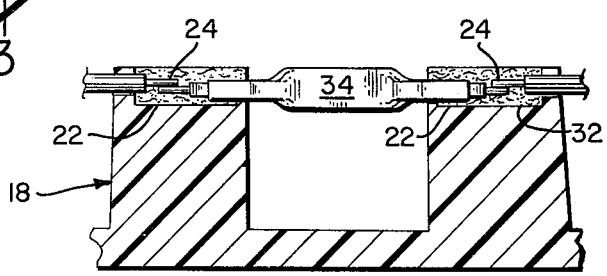
FIG. 3 is a cross-sectional view taken along lines 3—3 of FIG. 2.

In each of the receptacles 22 there is positioned exposed electrical parts terminals 24. The exposed (non-insulated) electrical terminals are retained within the receptacles 22 by mounting means 28. The mounting means 28 may be generally characterized as openings in the sidewalls 20 of the pedestals. In the embodiment shown in FIGS. 1–3, the openings are in the form of notches of a configuration corresponding to the outer diameter of electrical conductors 30, heater terminals 32 and opposing end structures of thermostat 34. Note that the electrical conductors 30 are suitably insulated to exclude moisture penetration.

It is desirable to have the openings 28 conform as closely as possible to the electrical part configuration to prevent the sealing material from flowing out the openings when injected about the exposed terminals 24. Of course the openings could be apertures or the like in the pedestal sidewalls 20. In a preferred embodiment, all electrical terminals with welded connections are made prior to the assembly of the components into the base. This facilitates assembly and permits a smaller pedestal size with less usage of a flowable insulating material.

The sidewalls 12 of the bowl structure 10 include an outlet opening 36. This opening is to provide access to the electrical connectors 38. The electrical connectors are positioned adjacent the outlet opening by a partition 40 located radially inwardly from the outlet opening. The partition includes positioning means 39 for locating the electrical connectors at the outlet opening while also presenting the connector terminal ends 24 within an adjacent pedestal.

The pedestal may be independent of the partition and a separate entity by itself or it can be formed integral with the partition whereby the partition would be a part of the pedestal and form one of the sidewalls thereof. This arrangement would likely be more advantageous in that it effects an economy in materials and mold design. The pedestal 18e may include a divider 27 to form two receptacles 22' for receipt of the terminal ends 24 of the electrical connectors 38. Note also that the sidewalls 21 of the pedestal adjacent to the paratition may extend transversely beyond the partition to the sidewalls 12 of the bowl.

Because only the exposed (non-insulated) portions of the electrical parts are encapsulated, a savings in sealing material is effected. Additionally, a lighter base structure is provided and one that can be attached to the bottom of a cooking utensil with uncomplicated means such as fusion bonding, rolled sheet metal joints or small bolt and nut means. In one embodiment a nut is used to engage the threaded portion of heating unit 31 thereby sandwiching the cooking utensil body's bottom between the nut and a gasket (not shown) placed on the flat portion 33 of unit 31.

With the present invention it would be of no consequence if the bottom structure was partially jarred loose from the cooking utensil body in that cleaning fluid could not affect the sealed electrical parts. In fact, when immersing the base structure, water will in fact flow around the electrical parts via outlet opening 36. As such, it is desirable to include drainage holes in the bottom 14 of the base structure to prevent residual water from remaining causing sanitary problems or encrustations resulting from the drying of hard water. The base structure is preferably formed of a plastic material such as Bakelite, phenolic resin or a type of material which has heat-insulating properties and is also impact resistant.

It can now be seen that the foregoing provides an immersible cooking utensil base structure which effects economies in materials and manufacturing while effecting a very lightweight durable construction. The structure is not at all affected by extreme heat or mechanical jolting or by immersion in harsh cleansing fluids.

While there has been shown one particular embodiment, it will be obvious to those skilled in the art that various changes and modifications may be made without departing from the spirit and scope of the invention. It is intended that the following claims cover all changes and modifications that fall within the scope of the invention.

We claim:

1. In an electrical cooking utensil base structure having a heating unit, thermostat and appropriate circuitry assembled therein to provide controlled heat for cooking, wherein the improvement comprises:

a base portion having a plarality of hollow pedestals extending upwardly from the bottom interior surface thereof, said pedestals forming receptacles for a sealing material and including mounting means for positioning electrical part connections within said receptacles, said base portion, pedestals and sealing material being constructed of dielectric material; and, sidewalls extending upwardly from the periphery of said bottom interior surface of said base portion.

2. The cooking utensil base structure of claim 1 wherein said sidewalls have an outlet opening therethrough, said outlet opening being partially enclosed by a portion of said bottom interior surface and a first partition radially offset inwardly from said opening and extending upwardly from said bottom surface, said partition including means for positioning electrical connectors at said opening and wherein at least one of said pedestals is located adjacent said partition for sealing the terminal ends of said electrical connectors.

3. The base structure of claim 2 wherein said pedestals include sidewalls and said partition forms one of the sidewalls of the pedestal located adjacent thereto.

4. The base structure of claim 1 wherein said mounting means comprise openings in the pedestal sidewalls, said openings adapted to retain said electrical part connections within said receptacles.

* * * * *